May 18, 1948.  E. W. MOORMAN ET AL  2,441,585
MOTOR CONTROL APPARATUS
Filed April 4, 1946
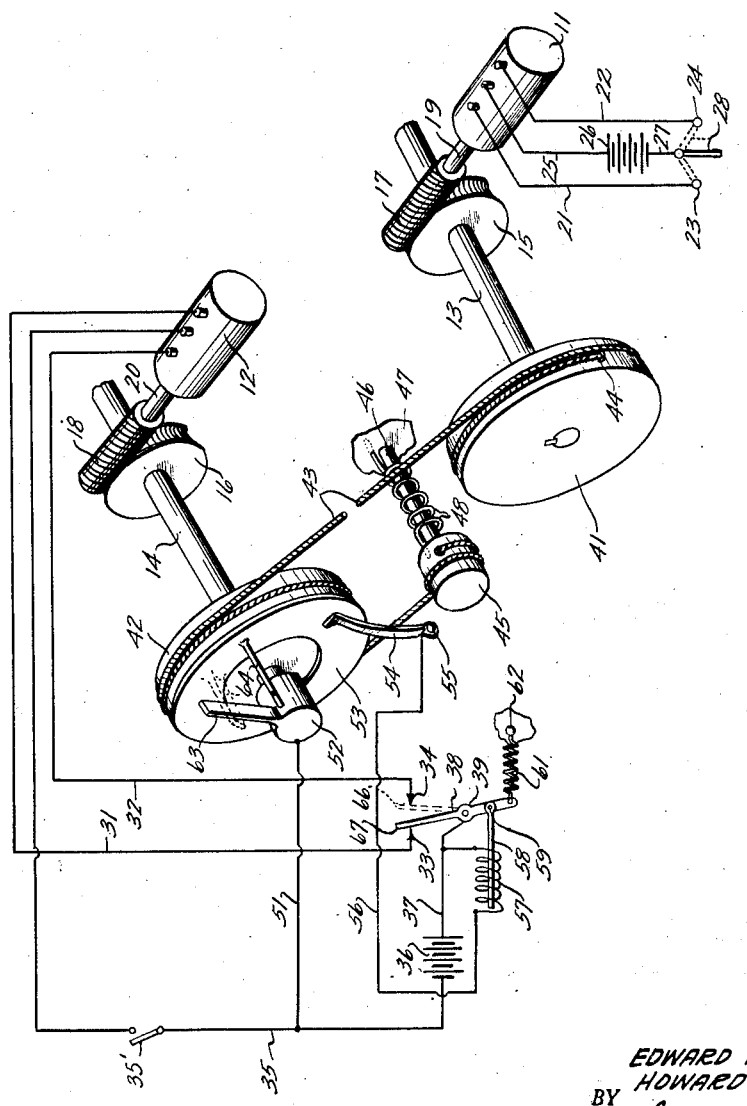
INVENTORS.
EDWARD W. MOORMAN
HOWARD A. KLEIN
BY
ATTORNEYS Patented May 18, 1948

2,441,585

UNITED STATES PATENT OFFICE 2,441,585

MOTOR CONTROL APPARATUS

Edward W. Moorman, Lawrence, Kans., and Howard A. Klein, Osborn, Ohio

Application April 4, 1946, Serial No. 659,638

5 Claims. (Cl. 318—74)

(Granted under the act of March 3, 1883, as amended April 30, 1928; 370 O. G. 757)

The invention described herein may be manufactured and used by or for the Government for governmental purposes, without the payment to us of any royalty thereon.

The present invention relates to a motor control apparatus for causing one electric motor to follow the operation of another electric motor, both in direction of rotation and degree of rotation.

An essential object of this invention is to provide a novel device for controlling the rotations of two companion motors which drive two rotary shafts or similar members that may be utilized to simultaneously operate a pair of control means, for example, ailerons or control surfaces on aircraft that are customarily controlled by such a pair of companion motors capable of operating in either direction of rotation.

A more particular object of this invention is to provide a controlling device for a pair of circuit-equipped motors and a pair of shafts driven thereby wherein the operative connection between the two motors with the two shafts comprises mechanical means including a pair of drums or similar members, one carried on each shaft, said drums being operatively connected by cable means, and all being arranged so that the rotation of the first shaft and drum, by the operation of the first motor, will rotate the second drum and thereby close the circuit to the second motor for rotating the second shaft in the same relative direction and to a degree proportional with respect to the rotation of the first shaft.

Another object of this invention is to provide an improved device comprising simple mechanical connecting means, which is inexpensive and durable, for effecting the symmetrical operation of a second motor and a member rotated thereby simultaneously with the operation of a companion first motor and a member that it rotates.

These and various other objects and advantages are attained with this invention, as will become apparent from the following description, taken in connection with the accompanying drawing wherein the invention is shown in its preferred form, it being evident that other arrangements and forms of construction may be resorted to in carrying out the objects and purposes of this invention.

The drawing shows partly in perspective and partly diagrammatically one form of our novel mechanical means for controlling the operations of a pair of motors along with the pair of rotary members that are driven thereby.

In this drawing we show the pair of companion motors spaced apart and including the first motor 11 and the second motor 12, arranged to drive the first shaft 13 and the second shaft 14, respectively, by means of the worm gears 15 and 16 secured on shafts 13 and 14, respectively, and engaged by the worms 17 and 18 fixed on the rotary shafts 19 and 20 of the motors 11 and 12, respectively.

The first motor 11 is equipped with a current-supplying circuit shown herein as including circuit wires 21 and 22 extending from the motor to switch contacts 23 and 24, and also including a circuit wire 25 extending from the motor to a power source or circuit-supplying means 26, shown as a battery. Said source is connected by a wire 27 to a switch arm 28 which is swingable into engagement with either of said contacts 23 or 24, for rotating this motor 11 and thereby its shaft 13 in either of two reverse directions.

The second motor 12 is equipped with a current-supplying circuit shown herein as including circuit wires 31 and 32 extending from the motor to switch contacts 33 and 34, respectively, and also including a circuit wire 35 extending to a power source 36, shown as a battery. A wire 37 leads from said battery to a switch arm 38 which is pivoted at 39 so as to be swingable into contact with either contact element 33 or 34 for effecting rotation of motor 12 and thereby shaft 14 in either of two reverse directions. In the circuit line 35 there is interposed an "on-off" switch 35' which is turned to an open circuit position when the motor control apparatus is not in use, thus turning off the motor 12.

The mechanical means utilized in this invention for controlling the rotation of the motor 12 and its shaft 14 with the rotation of the motor 11 and its shaft 13 comprises a disc or drum 41 keyed or otherwise secured on shaft 13 to rotate therewith, and a disc or drum 42 floatingly or rotatively mounted on shaft 14, and also cable means 43 operatively connecting the two drums. This cable means 43 is shown herein as a cable having one end secured to drum 41, as is indicated at 44; also having its intermediate part looped around drum 42, and having its other end secured to a capstan 45, so that the portion adjacent that end is being windable upon the circumference of said capstan. Said capstan 45 is rotatively mounted by a stem 46 on stationary means 47 of the mechanism whereon this device is utilized, and the capstan is urged by a coil spring 48 on the stem to wind up the end portion of said cable on the capstan.

The circuit of the second motor 12 is preferably provided with a relay for actuating the switch arm 38 to control this circuit; and the relay circuit includes a branch wire 51 extending from a head or end part 52 on the end of shaft 14 to the wire 35, and also includes an annular metal contact plate or washer-like disc 53 secured on one side of drum 42 and spaced from the shaft. By this construction these drums 41 and 42 may be made conveniently of plastic or other insulating material, and mounted on the metal shafts 13 and 14, with contact plate 53 on drum 42 spaced from said shaft 14. A contact finger 54, which is held stationary at 55, has sliding contact with said annular plate 53, and a wire 56 extends from said finger 54 to one end of a solenoid 57 which has its other end electrically connected with the wire 37 extending from the battery 36 to switch arm 38. The core 58 of this solenoid has its protruding end pivoted at 59 to the switch arm 38, adapted to actuate the arm in opposition to a spring 61 having one end connected to said arm and the other end held stationary by means 62. A leaf contact 63, slightly resilient, is fixed upon and extends radially from the end part 52 on shaft 14, and a post contact 64 extends from said metal plate 53 on drum 42. Said contacts 63 and 64 with plate 53 and the contact finger 54 with its wire 56 thus complete the relay circuit through solenoid 57 and battery 36 when post contact 64 is moved into engagement with leaf contact 63 upon rotation of drum 42 with its plate 53, that are rotative on shaft 14, thereby moving contact finger 38 into engagement with contact 34, against the resisting action of spring 61.

Our mechanical motor control apparatus is of general utility in connection with the operation of two companion motors and the associated pair of shafts that are rotated thereby for a short duration and not continuous in any one direction; and this controlling device is especially adapted for use on an airplane which contains a first shaft 13 mounted in one wing of the plane along with a servo motor 11 [controlled by a gyroscope, not shown] which controls the rotative position of said shaft 13, and thereby controls the position of the aileron on this first wing; while the other wing of the airplane contains a second shaft 14 driven by the second servo motor 12, thereby controlling the position of the aileron on that second wing.

In the operation of this device, to actuate the shafts and thereby operate the companion bodies that may be associated therewith, the switch 35′ is turned on and the starting switch member 28 is actuated to close either circuit through wire 21 or wire 22 of the first motor 11, so as to operate the motor in either one of its two directions. Its associated shaft 13 with drum 41 thereon will thereby be rotated to drive cable 43 and drum 42 with its plate 53 and its contact post 64, while the end of said cable is wound upon or is unwound from capstan 45, by the aid of spring 48, according to the direction of rotation of the motor. Considering that the shaft 13 and drum 41, as viewed in the drawing, are being driven in counter-clockwise direction, then spring 48 urges the capstan 45 to wind thereon the attached end of cable 43, while the drum 42 with the disc 53, which together are mounted rotatively on shaft 14, are also driven counter-clockwise and thus will move post contact 64 into contact with leaf contact 63, thereby closing the relay circuit from said contacts through wire 51, battery 36, wire 37, solenoid 57, wire 56, sliding finger 54, and disc 53 back to said contacts, thus drawing core 58 into the solenoid to move switch arm 38 to contact 34, as shown in the dotted line position at 66. This closes the circuit of the second motor 12 through wire 32 and wire 35, so as to rotate this second motor and its associated shaft 14 counter-clockwise along with the first motor 11 and shaft 13. The control apparatus and associated motors 11 and 12 are adapted thereby to operate simultaneously these companion shafts 13 and 14, and thereby likewise to operate simultaneously the companion control surfaces that may be connected with and actuated by said shafts.

When the first motor 11 and its shaft 13 with drum 41 stop, then this will also stop drum 42 with contact disc 53 and the post contact 64, whereby the leaf contact 63 will become disengaged from post contact 64, by the slight continued forward rotation of the rotating shaft 14 with its worm gear 16, thus breaking the solenoid circuit and enabling the spring 61 to retract arm 38 back to contact 33, to the full line position at 67, thereby closing the motor circuit through wires 31 and 35 and causing reverse or clockwise rotation of motor 12 and shaft 14 to a slight extent, until contact 63 returns into engagement with contact 64 and again closes the relay circuit. The shaft 14 will now rotate counter-clockwise just far enough to break the circuit to solenoid 57, thus reversing the direction of rotation of motor 12 and shaft 14. Therefore it will be seen that while contact 64 is relatively stationary, the contact 63 will be moved back and forth slightly as it engages and disengages contact 64 and also as the motor 12 continues to operate in opposite directions intermittently.

In starting the control apparatus or system as above outlined it will be noted that as soon as the line switch 35′ is turned on, the motor 12 will begin to turn in a direction to rotate shaft 14 in clockwise direction. Thus the subsequent engagement of contacts 63 and 64 will occur sooner than if the movement of contact 64 were alone depended on for this action. Of course as described above the engagement of the two movable contacts 63 and 64 acts by means of a relay to reverse the direction of rotation of the motor 12, or in other words to cause the shaft 14 to rotate in a counter-clockwise direction.

For a further description of the operation assume now that switch 35′ is turned on and that the switch member 28 is closed on one of its contacts to cause rotation of shaft 13 in a clockwise direction. The consequent movement of drive cable 43 will turn the drum 42 in a clockwise direction to produce a definite disengagement of contacts 63 and 64. The relay control of motor 12 will now cause the shaft 14 to operate in a clockwise direction, if the contacts 63 and 64 were not already separated before the motor 11 was started. Thus the shaft 14 will follow the movement of shaft 13 in direction and amount of rotation. The contact 63 will follow the contact 64 at some distance, depending on the spaced relation thereof when the control system was put in operation. If in some manner the contact 63 does overtake the contact 64, the resulting operation of the control relay will cause shaft 14 to be turned in a counter-clockwise direction just long enough to break the circuit to solenoid 57, thus reversing the motor 12 and again causing the shaft 14 to follow the clockwise rotation of shaft 13. If the switch arm 28 is moved to open position the drums 41 and 42 will stop and contact 63 will continue moving until it engages the contact 64. The motor 12 will thus reverse its rotation long enough to separate the contacts, thus causing the intermittent reversing action of motor 12 described previously. Of course the switch 35' may be turned off when switch arm 28 is turned to the off position, thus taking the motor control system out of operation completely.

The relative directions of rotation chosen above for purposes of describing the operation of the motor control apparatus should be understood to be merely illustrative, and do not impose conditions under which the apparatus must necessarily operate. The embodiment of the invention herein shown and described is to be regarded as illustrative only and it is to be understood that the invention is susceptible to variations, modifications and changes within the scope of the appended claims.

We claim:

1. In a mechanism including a first rotary shaft and a second rotary shaft and a circuit-equipped driving motor for each of said shafts, the improvement which comprises a pair of drums, the first drum being fixed on said first shaft and the second drum mounted floatingly on said second shaft, electric contact elements connected with the circuit of the second motor and including one element connected with the second shaft and another element connected with the second drum, and cable means operatively connecting the floating second drum with the first drum, whereby through operation of the first motor to intermittently join and separate said contact elements and thereby close the circuit to the second motor to drive it for rotating the second shaft simultaneously with respect to the first shaft.

2. In a mechanism including a first rotary shaft and a second rotary shaft and a pair of circuit-equipped motors each for driving one of said shafts, the improvement which comprises a pair of drums, the first drum being fixed on said first shaft and the second drum mounted rotatively on said second shaft, electric control means connected with the circuit of the second motor and including one contact element secured to the second shaft and another contact element carried by the second drum, a spring loaded capstan, and a cable operatively connecting the second drum with the first drum and being drawn taut by the capstan, whereby through operation of the first motor to intermittently join and separate said contact elements and thereby close the circuit to the second motor for rotating it with the second shaft simultaneously with respect to the first motor and the first shaft.

3. In a mechanism including a pair of rotary shafts spaced apart and a pair of servo motors provided each with a current-supplying circuit for driving one of said shafts, the improvement which comprises a drum secured on one of the shafts, a drum floatingly mounted on the other of said shafts, a relay included in the motor circuit of the said other shaft, contact elements electrically connected with the relay and including one element secured on the said other shaft and another element mounted on the floating drum and insulated from said other shaft, and cable means connecting said two drums, whereby the said one of the shafts and its drum will rotate the floating drum to engage the two elements and operate the relay to actuate said circuit of the other servo motor for driving the said other shaft simultaneously with the operation of the said one shaft.

4. In a mechanism including a first rotary shaft and a second rotary shaft spaced apart and a first and second driving motor, each provided with a switch-equipped power circuit, for driving respectively each of said shafts, the improvement which comprises a pair of drums, the first drum secured on the first shaft and the second drum mounted rotatively on the second shaft, a relay circuit associated with the second motor circuit and including electric means for actuating the switch in the second motor circuit, a spring to retract said switch in opposition to said electric means, contact elements in the relay circuit and including one element secured on the second shaft and another element mounted on the second drum, a spring actuated capstan, and a cable looped around one drum, having one end secured to the other drum, and its other end connected to the capstan, whereby rotation of the first shaft and its drum will rotate the second drum to engage the two elements and actuate said relay, thereby closing the circuit of the second motor for driving it and said second shaft simultaneously with the said first motor and its shaft.

5. In a mechanism including a first reversible electric motor driving a first shaft and a second reversible electric motor driving a second shaft, a motor control apparatus comprising a reversing switch for said first motor, a control switch for said second motor including a contact member movable with said second shaft and another contact member rotatably mounted with respect to said second shaft and in coaxial relation therewith, means to rotate the latter contact member in the same direction and at the same time that said first shaft rotates, a reversing relay for said second motor having a normal position to cause rotation of said second motor in one direction, circuit connections from said contact members to said relay whereby engagement of said contact members actuates said relay to a motor reversing position to operate said second motor in the opposite direction, whereby rotation of said first motor and said first shaft in the same relative direction as said second motor and said second shaft with the relay in the normal position maintains said contact members in spaced apart relation, and whereby reversal of said first motor and said first shaft by operation of said reversing switch causes engagement of said contact members and reversal of said second motor and said second shaft upon actuation of said relay to said motor reversing position.

EDWARD W. MOORMAN.
HOWARD A. KLEIN.

REFERENCES CITED

The following references are of record in the file of this patent:

UNITED STATES PATENTS

| Number | Name | Date |
|---|---|---|
| 932,031 | Krone et al. | Aug. 24, 1909 |
| 1,122,942 | Kaminski | Dec. 29, 1914 |
| 1,144,552 | Lardner et al. | June 29, 1915 |
| 2,425,442 | Schall et al. | Aug. 12, 1947 |